(12) United States Patent
Mills et al.

(10) Patent No.: US 6,360,044 B1
(45) Date of Patent: Mar. 19, 2002

(54) OPTICAL ARTICLE PRINTING FOR CONTROLLED ATTENUATION

(75) Inventors: Gregory A. Mills, Claremont, NC (US); Jeff J. Englebert, Painted Post, NY (US); Christopher K. Eoll, deceased, late of Hickory, NC (US), by Caroline B. Eoll, legal representative

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/466,941

(22) Filed: Dec. 20, 1999

Related U.S. Application Data

(63) Continuation-in-part of application No. 09/039,687, filed on Mar. 16, 1998, now Pat. No. 6,064,789.

(51) Int. Cl.$^7$ ................................................. G02B 6/44
(52) U.S. Cl. .................... 385/114; 385/100; 101/35; 347/2; 347/4; 347/74; 283/17
(58) Field of Search ................................. 385/114, 100, 385/104, 111; 101/35, 41, 42, 43, 44; 347/2, 4, 15, 74; 283/17

(56) References Cited

U.S. PATENT DOCUMENTS

| | | | | |
|---|---|---|---|---|
| 4,575,730 A | * | 3/1986 | Logan | 346/75 |
| 4,644,369 A | * | 2/1987 | Gamblin | 346/75 |

FOREIGN PATENT DOCUMENTS

| | | | |
|---|---|---|---|
| GB | 2282563 | * | 4/1995 |

OTHER PUBLICATIONS

Contact Precision Instruments, *WN white noise*.
Dynapar Corporation, D–400 Catalog, *Brushless Digital Tach Feedback Signal*, Series FV2, Mar. 1991, pp. 78–79.
C.B. Probst et al., Experimental Verification of Microbending Theory Using Mode Coupling to Discrete Cladding Modes, Journal of Lightwave Technology, vol. 7, No. 1, Jan. 1989, pp. 55–61.
Electronic Industries Association, Engineering Department, EIA/TIA Standard, Spectral–Attenuation Cutback Measurement for Single–Mode Optical Fibers, EIA–TIA–455–78A, May 1990, pp. 1–7.
White Instruments, ParaMedic Code Pink, ParaMedic Code Pink–T, *Advanced Technology Digital Parametric Masking Generator*, Sep. 1998, pp. 64–65.

\* cited by examiner

*Primary Examiner*—Darren Schuberg
*Assistant Examiner*—Leo Boutsikaris
(74) *Attorney, Agent, or Firm*—Timothy J. Aberle

(57) ABSTRACT

An optical article including at least one optical fiber and a printable layer connected to the optical fiber. The printable layer including randomly spaced printed ink shapes for avoiding or controlling optical attenuation. A method and an apparatus for making optical articles with the randomized ink shape spacings are also disclosed.

14 Claims, 5 Drawing Sheets

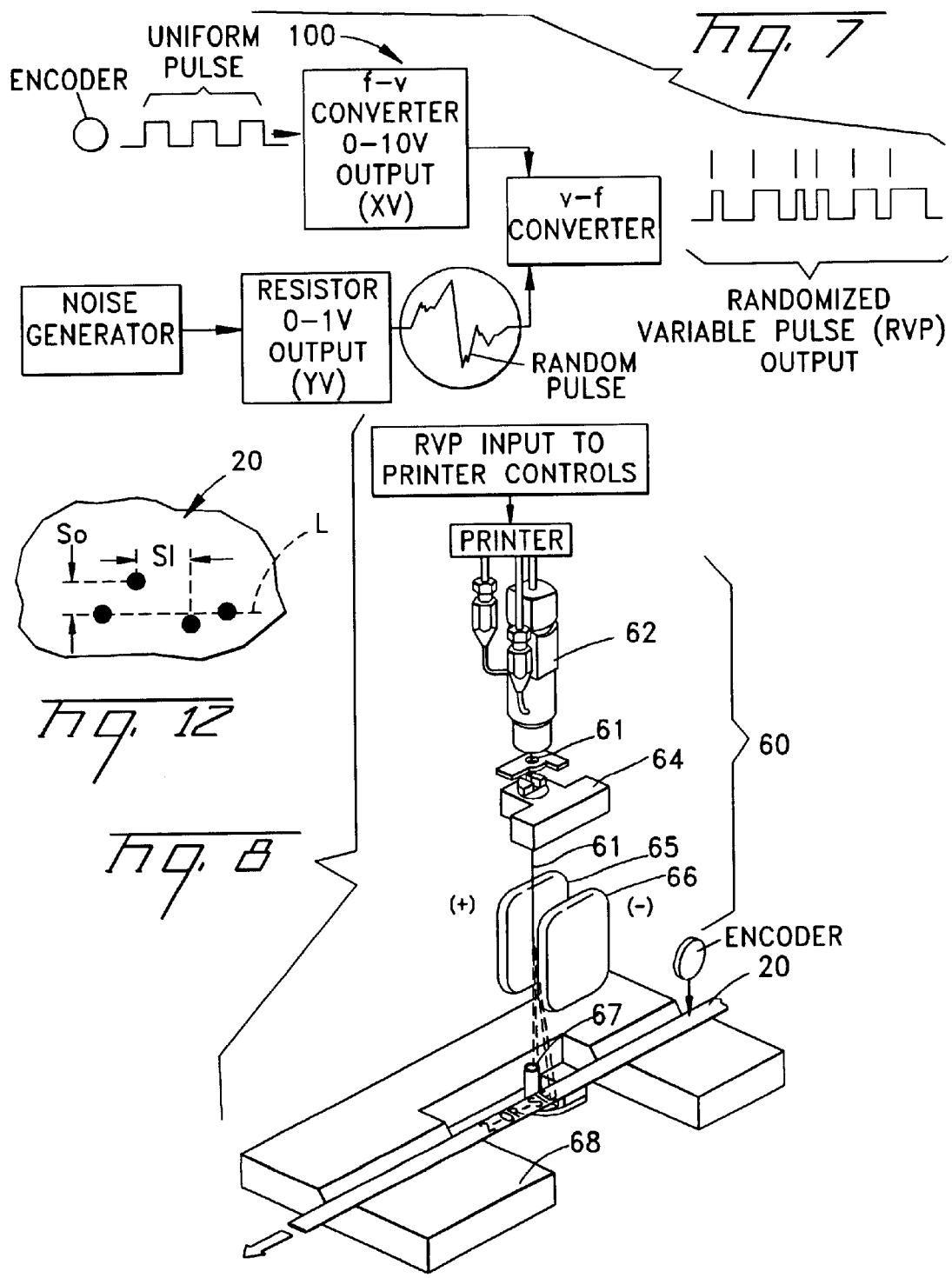

OPTICAL ARTICLE PRINTING FOR CONTROLLED ATTENUATION

RELATED APPLICATION

The present application is a Continuation-in-Part of U.S. Ser. No. 09/039,687, filed on Mar. 16, 1998 now U.S. Pat. No. 6,064,789, the subs matter of which is incorporated by reference herein.

FIELD OF THE INVENTION

The present invention relates to an optical article and, more particularly, to an optical article having at least one optical fiber and having a printable layer with an indicia printed thereon.

BACKGROUND OF THE INVENTION

Conventional fiber optic cables comprise optical fibers that conduct light which is used to transmit voice, video, and data information. An optical ribbon includes a group of optical fibers that are coated with a printable ribbon common layer, which common layer may be of the ultraviolet (UV) light curable type. Typically, such a ribbon common layer is extruded about a group of optical fibers that have been arranged in a planar array, and is then irradiated with a UV light source that cures the ribbon common layer. The cured ribbon common layer protects the optical fibers and generally aligns the respective positions of optical fibers in the planar array.

To further illustrate the background of the present invention, FIGS. 2–5 show known optical ribbons. More specifically, FIG. 2 shows adjacent optical ribbons 14–1 and 14–2 of a known ribbon stack 12. Optical ribbons 14–1,14–2 each include optical fibers 15 encased in a ribbon common layer 19. A craftsman may gain access to optical ribbons 14–1,14–2 by cutting away outer portions of the cable to expose ribbon stack 12. Once stack 12 is exposed, the craftsman may desire to distinguish between and classify the ribbons according to, for example, which telecommunications circuit they are to be associated with. To classify the ribbons, the craftsman may look for indicias on each ribbon, for example, a series of alpha-numeric characters that define a label or indicia 16 (FIG. 3).

As shown in FIG. 3, indicia 16 includes a series of printed dots 17 that collectively depict the alpha-numeric characters. Dots 17 are small masses of ink material that present bump-like (FIGS. 4–5) and/or trough-like (not shown) irregularities on and/or in the surface of common layer 19. The characters of indicia 16 are made at a conventional print pitch P of about 4.21 to 5.5 characters per centimeter (ch/cm). Indicias 16 are typically repeated longitudinally on the ribbon at print spacing intervals. A typical print spacing is about 150–200 mm and above. A 5.5 ch/cm print pitch on ribbon 14-1 as shown in the transverse cross section of FIG. 4, and the longitudinal cross section of FIG. 5, results in dots 17a of indicia 16 very nearly touching, and dots 17b being overlapped to some extent. Rather than being discrete dots, dots 17a, 17b may in some places form lines. Moreover, dots 17 present, at regular intervals, the bump-like and/or trough-like irregularities on and/or in the surface of common layer 19 at regular transverse spacings $S_t$ (FIG. 4) and longitudinal spacings $S_1$ (FIG. 5). Spacings $S_t$ and $S_1$ are constant and non-randomized. A printing machine causes the dots to be transversely and longitudinally made at the regular intervals in and/or on the ribbon common layer directly over or adjacent to the optical fibers.

Known ribbon indicia of the printed ink type may be printed on the ribbon common layer or on optical fibers. U.S. Pat. No. 5,485,539 discloses printed ink dots on a ribbon common layer that define layered dots that form symbols. A transparent, anti-abrasion coating may be applied over the printed ink dots.

U.S. Pat. No. 5,119,464 discloses a process for directly marking optical fibers with ink as they move in a planar array before being coated with a protective envelope. An ink jet sprays the optical fibers with ink as the fibers move along a production line. The ink jet is driven to reciprocate in a direction that is transverse to the direction of movement of the fibers along the production line. As this occurs, bands of ink are deposited on the optical fibers. The bands of ink are staggered with respect to each other across the array of optical fibers. The result is a group of optical fibers each having a characteristic ink band spacing.

The foregoing disclosures do not teach or suggest a cognizance of any relationship between the printed indicia and attenuation loss in the optical fibers. On the other hand, the present inventors have discovered that printing dots on an optical ribbon at regular intervals can contribute to an undesirable delta attenuation. Attenuation indicates a degradation in performance due to a loss in power from one point to another along a light waveguide path, e.g., an optical fiber. Attenuation is generally measured in terms of decibels per kilometer (dB/km) at a specified wavelength. Attenuation varies with the wavelength of light propagating through the optical fiber. A delta attenuation is the change in attenuation that a modified optical fiber experiences as measured relative to a reference attenuation measurement of the optical fiber in a pre-modified state. For example, delta attenuation is a measure of the increase in attenuation a colored optical fiber experiences as compared to the attenuation the optical fiber experienced without the coloring layer. Since increases in attenuation degrade the performance of an optical fiber, high delta attenuations are undesirable. Attenuation may be caused by microbending or macrobending of the optical fiber. A microbend loss may result from the optical fiber passing over small bumps. Optical fibers have windows of low-loss wavelength regions where the fiber will carry light with little attenuation. One of the windows is known as a 1310 nm wavelength region, and another is in the 1550 nm wavelength region.

FIG. 6 is a graph showing attenuation, as a function of wavelength, in optical fibers of an optical ribbon having a known indicia with dot spacings $S_t, S_l$ made at regular, non-randomized intervals. The inventors of the present invention have discovered a relationship between spacing of ink shapes and attenuation, for example, to the effect that the known indicia creates undesirable attenuation or spectral bumps in the 1310 nm wavelength region. Even for a range of mode field diameters (MFD), e.g., 9.08, 9.18, and 9.31, the attenuation bumps still exist, apparently due to a harmonic response caused by the regularity of the spacing on the optical fibers.

OBJECTS OF THE INVENTION

One aspect of the present invention is a method of printing ink shapes on an optical article so that optical attenuation is controlled. The optical article may include at least one optical fiber and a printable layer associated with the optical fiber. The method comprises the steps of moving the optical article along a manufacturing line, supplying a randomized pulse input to a printing apparatus, and printing randomly spaced ink shapes on the optical article.

Another aspect of the present invention is an optical article and a printable layer associated with the optical article, the printable layer including at least one indicia thereon. The indicia includes randomly spaced printed ink shapes for controlling optical attenuation.

Another aspect of the present invention is a printing apparatus and randomizing system for printing randomized ink shapes on an optical article. The randomizing system comprises a noise generator generating a random pulse and a uniform pulse source generating a uniform pulse the uniform and random pulses being summed to define a randomized variable pulse. The printing apparatus is operatively associated with the randomizing system, and includes printer controls that receive the randomized variable pulse from the randomizing system as an input. The printing apparatus comprises an ink jet stream directed toward the optical article whereby the optical article is printed with randomly spaced ink shapes.

BRIEF DESCRIPTION OF THE DRAWING FIGURES

Figure 2:
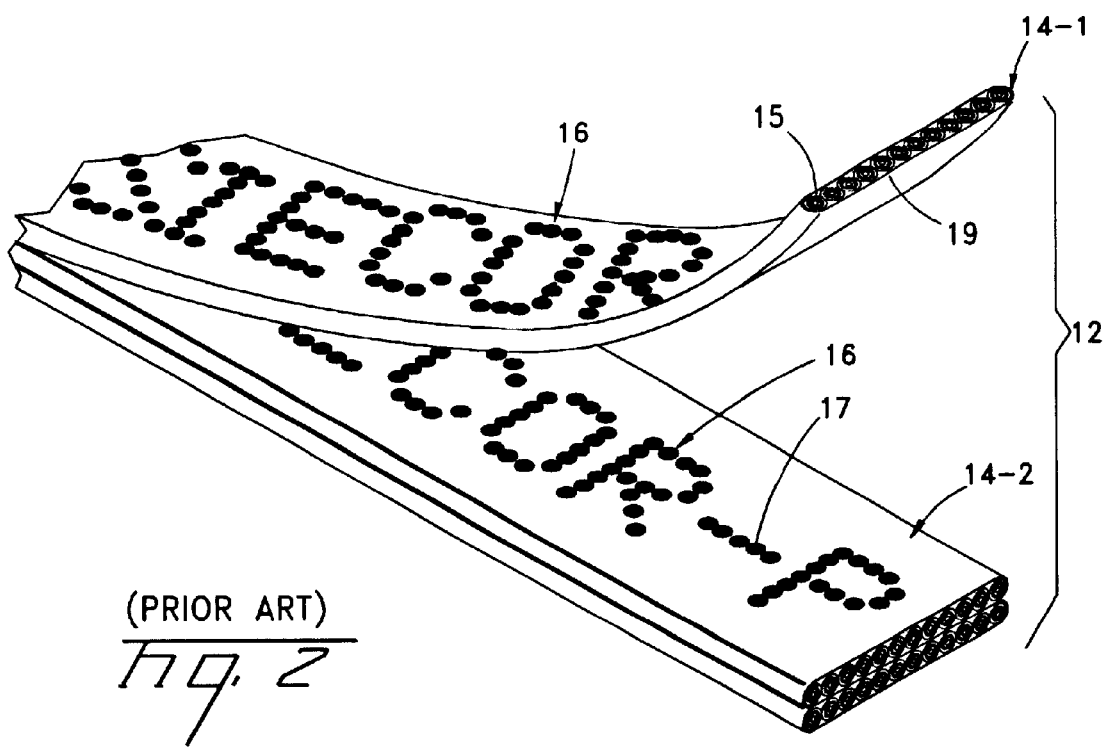
FIG. 2 is an enlarged view of known optical ribbons.
Figure 3:
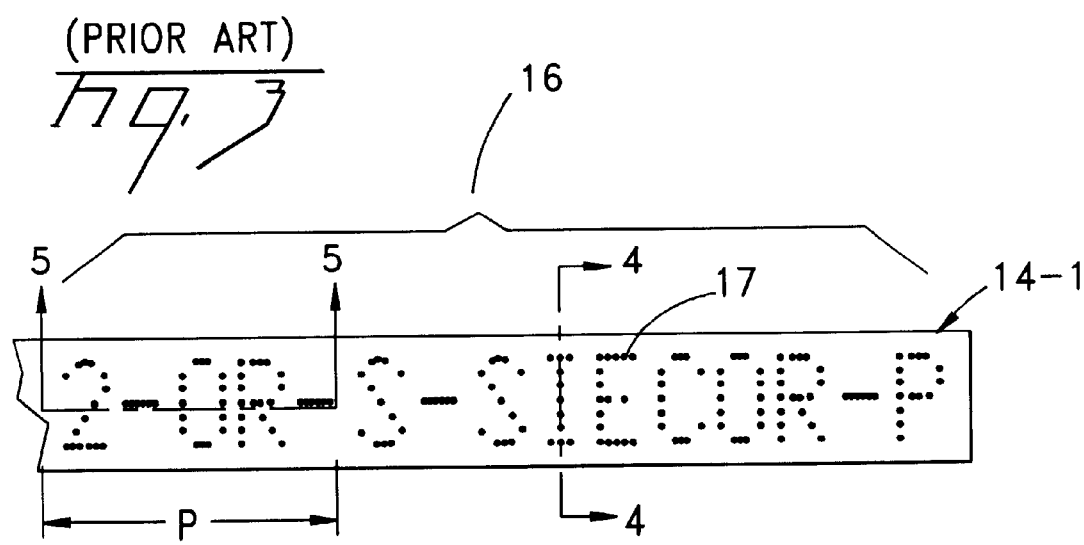

FIG. 3 schematic view of an indicia printed on at least one, of the optical ribbons of FIG. 2.

Figure 4:
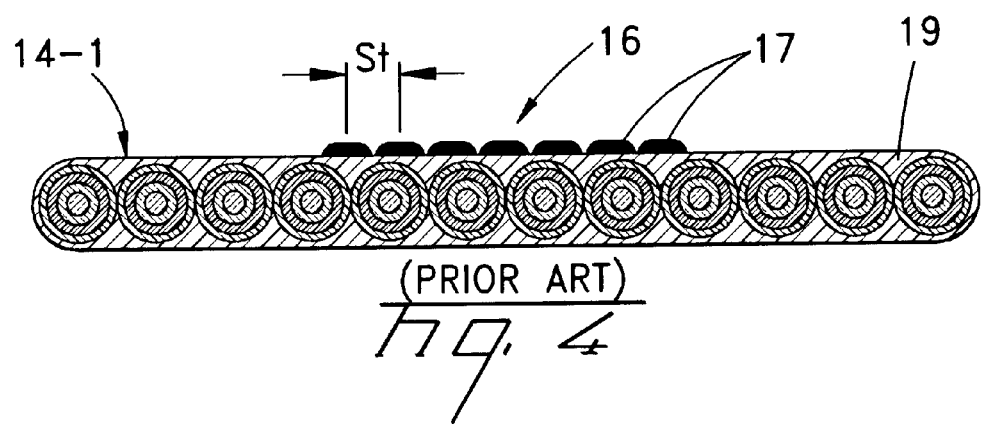

FIG. 4 is a transverse, cross sectional schematic view of the optical ribbon of FIG. 2.

Figure 5:
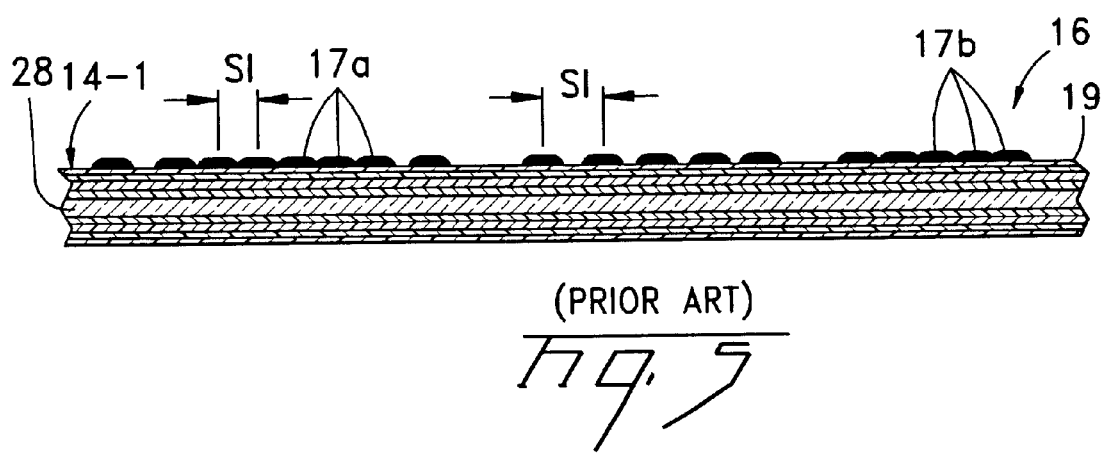

FIG. 5 is a longitudinal, cross sectional schematic view of the optical ribbon of FIG. 2.

Figure 6:
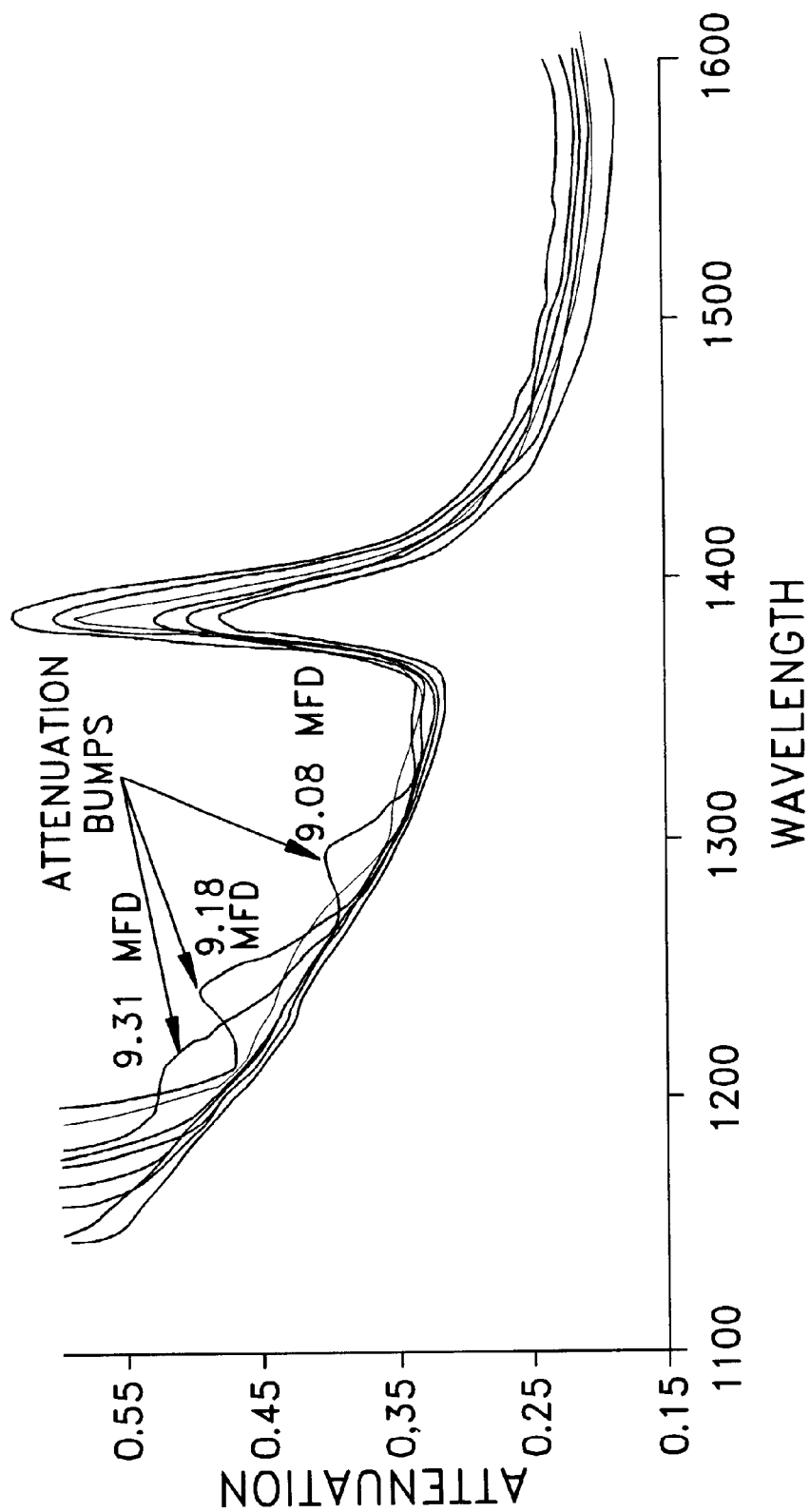

FIG. 6 is a graph showing attenuation, as a function of wavelength, in optical fibers of a known optical ribbon having an indicia with dot spacings made at regular non-randomized intervals.

FIG. 7 a diagrammatic view of a randomizing system according the present invention.

FIG. 8 isometric view of a printing apparatus suitable for making randomized ink shapes on an optical article according to the present invention.

Figure 9:
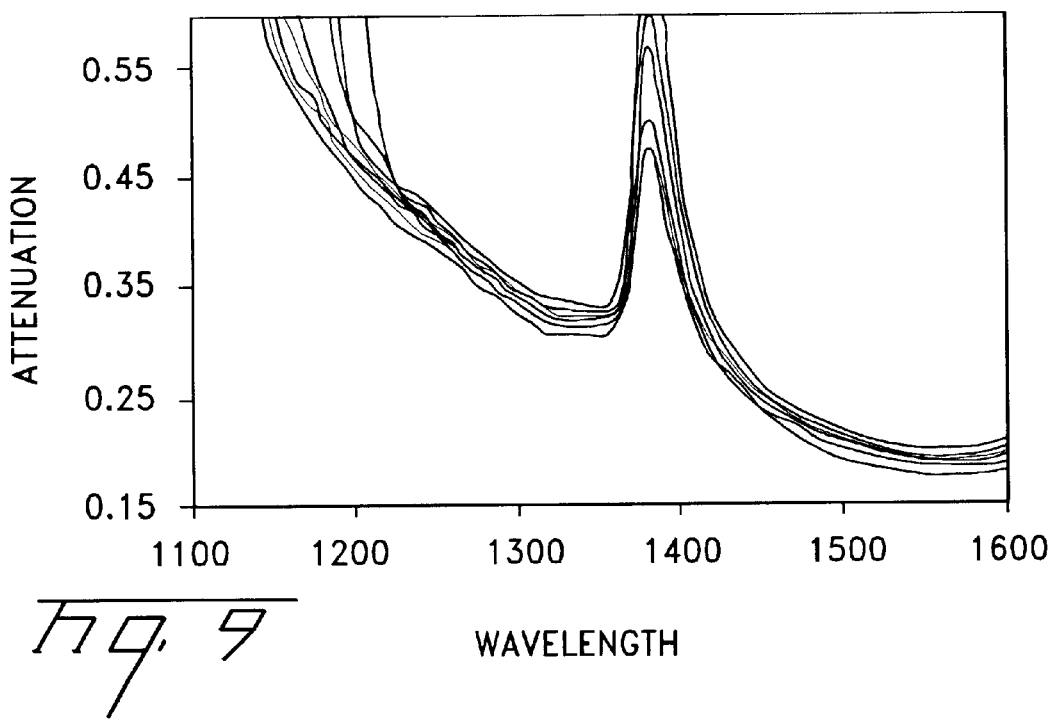

FIG. 9 is a graph showing attenuation, as a function of wavelength, of an optical article having an indicia with a randomized ink shape spacing according to the present invention.

Figure 10:
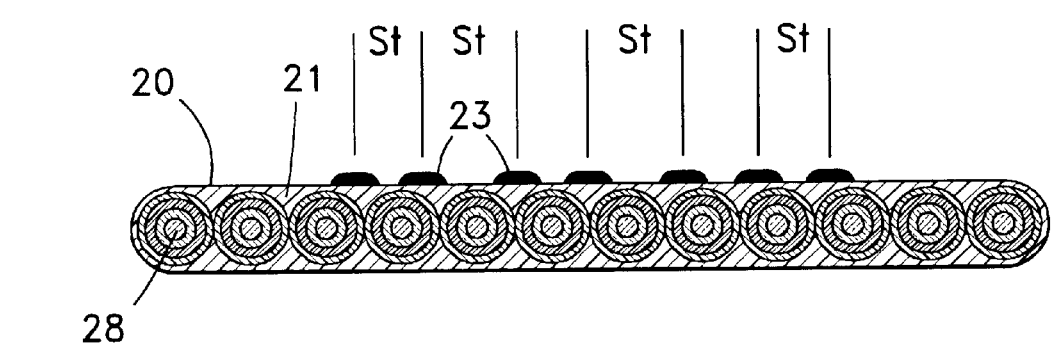

FIG. 10 is a transverse cross sectional view of an optical article with a randomized ink shape spacing according to the sent invention.

Figure 11:
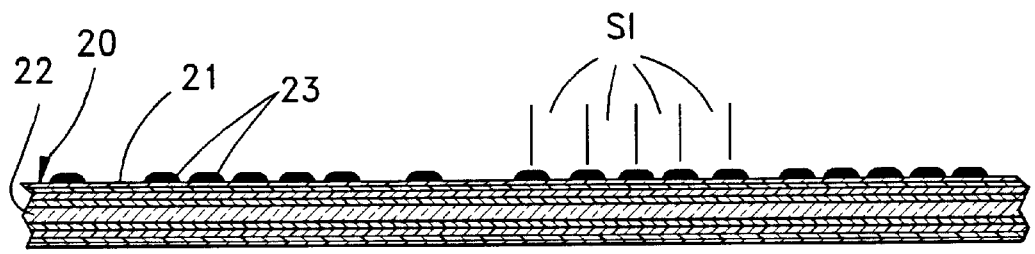

FIG. 11 is a longitudinal cross section of an optical article with randomized ink shape spacing according to the present invention.

FIG. 12 is a schematic plan view of a portion of an optical article with a randomized ink shape spacing according to the present invention.

DETAILED DESCRIPTION OF THE INVENTION

An embodiment of the present invention is an optical article including a group of optical fibers with a printable layer connected thereto. For example, the optical article can be a bundle of optical fibers or an optical ribbon, having a printable layer of a cured thermoplastic. The printed layer comprises symbols formed of randomly spaced printed ink shapes, for example, randomly spaced dots, lines, or bars. In a preferred embodiment, randomly spaced dots are formed on the optical article in a printing operation utilizing a randomizing system of the present invention. Randomly spacing at least some of the ink shapes on the optical articles avoids attenuation bumps (FIG. 6) in the preferred useable wavelength region of 1250 nm to 1700 nm and, more preferably, 1280 nm to 1350 nm. The inventors of the present invention have discovered a synergistic relationship between printed indicia and attenuation bumps, namely, that an optical article comprising a printed indicia can experience significant attenuation bumps caused by the indicia printed thereon.

Experimental data underpin the inventive principles developed herein. FIG. 6 is a graphical representation of the affect of a printed indicia on the attenuation of an optical article, for example, an optical ribbon. The attenuation profiles show spectral bumps in a preferred transmission range. When an optical fiber ribbon was printed according to a printing method of the present invention utilizing an exemplary randomizing system 100 (FIG. 7), the attenuation bumps were no longer present (FIG. 9). An exemplary embodiment of randomizing system 100 comprises an input uniform pulse added to a random pulse that results in a randomized variable pulse (RVP) output.

More specifically, a conventional encoder (FIGS. 7–8), for example, manufactured by Balloff, provides a uniform pulse output that is indicative of a constant speed of an exemplary optical ribbon 20 (FIG. 8) moving in a manufacturing line. The uniform pulse is fed into a frequency to voltage converter defining a voltage XV (FIG. 7). A model FV2 converter manufactured by Dynapar Corp. is suitable for use with the present invention. A noise generator, i.e., a conventional white noise generator, provides a 0 to 1 volt random noise signal defining a random pulse voltage YV. A suitable noise generator is manufactured by, for example, Contact Precision Instruments, Inc. The random and uniform pulse voltages XV,YV are summed in a voltage to frequency converter. The output of the is voltage to frequency converter is the RVP output, which output is fed to controls of a printing apparatus, for example, manufactured by Weidenbach.

Referring to FIG. 8, the randomized printing process according to the present invention will be more fully described with reference to an exemplary printing apparatus 60. Printing apparatus 60 includes a nozzle 62, a charging electrode 64, deflector plates 65,66 that are connected to a high voltage, and a recirculation tube 67. The encoder operatively senses the essentially constant speed of ribbon 20 as it moves through a print station 68 below apparatus 60. The encoder inputs a signal to system 100 (FIG. 7) and the RVP is an input to the printer controls. The printer controls are preferably pre-programmed to a line speed reference whereby the indicias are to be printed on the optical ribbon as a function of the line speed. The printer controls preferably read the RVP input as a varied line speed input and randomly changes the dot spacing by commanding an ink jet 61, a charging electrode, and deflector plates.

More specifically, ink jet 61 sprays conductive ink from nozzle 62 in the form of ink drops. The drops that are required to create the printed symbols on ribbon 20 are electrostatically charged by applying a pulsed voltage between charging electrode 64 and nozzle 62 thereby causing an ion shift in certain ones of the ink drops. All drops traverse an electrical field between deflector plates 65, 66, but only the charged drops are deflected by the electrical field onto ribbon 20. Uncharged drops go into recirculation tube 67 and are reused in the ink circuit.

Based on the magnitude of their respective charges, the charged drops are deflected to different degrees by the electrical field between deflector plates 65, 66. The RVP input causes the printer controls and deflector plates to make the charged drops impact optical ribbon 20 such that, rather than being at regular intervals, the ink shape spacings are randomized. Based on the magnitude of their respective charges, the charged drops are deflected to different degrees by the electrical field between deflector plates 65, 66.

Ribbon 20 is printed with a randomized spacing according to the present invention as ribbon 20 moves at print station 68 such that attenuation bumps are avoided (FIG. 9). The data for the attenuation versus wavelength chart of FIG. 9 is generated by calculating a reference power value to sample power value ratio over a range of wavelengths. Optical ribbon 20 comprises optical fibers 22 in a common coating 21 having ink shapes applied thereto in the form of, e.g., lines, bars, or dots 23 printed thereon (FIGS. 10–11). In the preferred embodiment, the printer controls are programmed such that the transverse and longitudinal dot spacings $S_t$, $S_1$ are randomized, that is they can be generally randomly spaced along the same line. However, randomizing $S_t$ is believed to have the most significant impact on avoiding attenuation bumps. In the preferred embodiment, the dot spacing is nominally about 450 $\mu$m, with a randomizing affect whereby the dots can be about ±25 to ±50 $\mu$m or more away from nominal along a reference line.

In addition to the transverse and longitudinal random spacings $S_t$, $S_1$, the dots can be offset at an offset spacing $S_o$, i.e., the dots will generally not be disposed along a common line (FIG. 12). A preferred $S_o$ is ±50 $\mu$m from a nominal reference line L (FIG. 12). The randomized dots can be printed over the entirety of optical ribbon 20 or on selected portions thereof. The randomized spacings caused by utilization of randomizing system 100 can avoid attenuation bumps. However, some of the random dot spacings may be repeated by coincidence.

Figure 1:
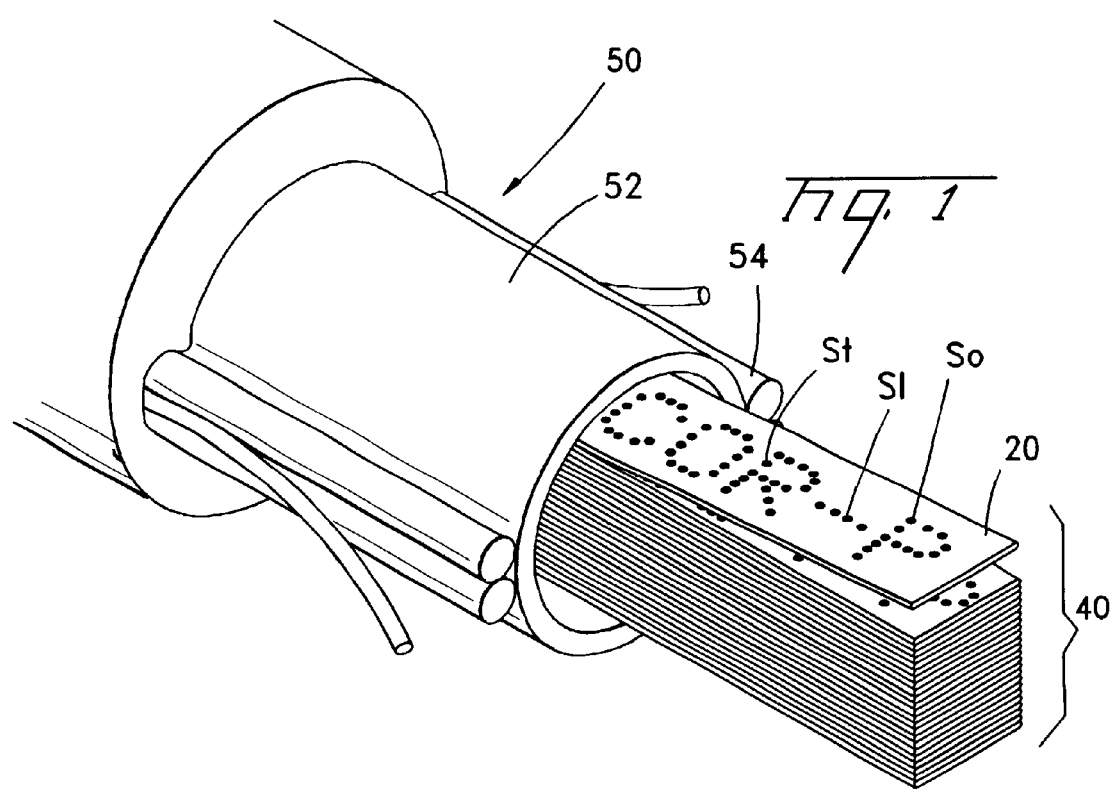
FIG. 1 is an isometric view of a fiber optic cable according to the present invention.

Optical ribbons 20 according to the present invention can be formed into a stack 40 and placed in an exemplary optical fiber cable 50 (FIG. 1). Stack 40 is disposed within, for example, a thermoplastic core tube 52 having metallic or dielectric strength members 54 adjacent thereto and surrounded by a thermoplastic jacket 56. Optical ribbons 20 include at least some alpha-numeric characters having a randomized dot spacing according to the present invention. The spacings on any optical ribbon 20 in stack 40 can be transverse $S_t$, longitudinal $S_1$, and/or offset $S_o$ randomized spacings in accordance with the present invention thereby avoiding attenuation bumps.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, ink shapes can be randomly spaced according to the present invention on a printable layer of a single optical fiber. In addition, all or some of the indicia according to the present invention may be overcoated with a protective layer, for example, as disclosed in U.S. Pat. No 5,485,539, which is hereby incorporated by reference in its entirety. Although some of the embodiments are generally directed to ink shapes comprising a dot matrix format, the invention may be adapted for use with double stroke, stylized, or custom symbols within the scope of the appended claims.

In addition, the present invention can be useful in avoiding attenuation bumps where the optical ribbon has ink shapes defining a bar or binary number code. The ink shape diameter and height may be controlled by varying the viscosity and density of the ink and the size of the ink nozzle. Preferably, where dots are used, the randomized dot-to-dot spacing is greater than the dot diameter.

Instead of individual components, at least part of randomizing system 100 can comprise a programmable logic controller. The present invention can be used to make the attenuation bumps disappear, or move the location of the bumps so that they exist but in a location away from the desired transmission window, e.g., by randomly spacing the ink shapes so that the attenuation bumps are relocated to the 1250 nm region or less. In yet a further embodiment, the randomized ink shape spacing can be accomplished by oscillating the ribbon during printing with a suitable oscillation source. Optical articles preferably include at least one optical fiber; however, the claimed invention can encompass any optical article affected by printing.

Accordingly, what is claimed is:

1. A method of printing ink shapes on an optical article, the method comprising the steps of:
   moving said optical article along a line, said optical article comprising at least one optical waveguide and a printable layer associated with the at least one optical waveguide;
   supplying a randomized pulse input to a printing apparatus; and said printing apparatus printing randomly spaced ink shapes on said optical article in response to the randomized pulse input.

2. In the method of claim 1, said ink shapes defining bars, lines, or dots.

3. In the method of claim 1, said randomized pulse input comprising the summation of a uniform pulse input and a randomized pulse input.

4. In the method of claim 1, said uniform pulse input being generated by an encoder sensing a line speed of said optical article.

5. In the method of claim 1, said randomized pulse input being generated by an electronic noise generator.

6. An optical article having transverse and longitudinal dimensions, comprising:
   a printable layer associated with said optical article, said optical article includes at least one optical waveguide, said printable layer including at least one indicia thereon, said at least one indicia comprising randomly spaced printed ink shapes.

7. The optical article of claim 6, said ink shapes comprising bars, lines, or dots.

8. The optical article of claim 6, the spacings of said ink shapes being randomized generally along said transverse dimension.

9. The optical article of claim 6, the spacings of said ink shapes being randomized generally along said longitudinal dimension.

10. The optical article of claim 6, the spacings of said ink shapes being generally randomly offset from a reference line.

11. The optical article of claim 6, said ink shapes being randomized generally in both of said transverse and longitudinal dimensions.

12. The optical article of claim 6, the ink shape spacing being nominally about 450 $\mu$m, with a randomizing affect whereby said ink shapes can be about ±25 $\mu$m to ±50 $\mu$m away from said nominal spacing.

13. The optical article of claim 6, said printable layer comprising a ribbon common layer formed about a group of optical fibers.

14. A printing apparatus and randomizing system for printing randomized ink shapes on an optical article: said randomizing system comprising a noise generator generating a random pulse, and a uniform pulse source generating a uniform pulse, said uniform and random pulses being summed to define a randomized variable pulse; and said printing apparatus comprising printer controls operatively associated with said randomizing system, said controls receiving the randomized variable pulse from said randomizing system as an input, said printing apparatus comprising an ink jet stream, at least a portion of said stream being deflected on said optical article whereby said optical article comprises at least one optical waveguide and a printable layer associated with the at least one optical waveguide and is printed with randomly spaced ink shapes.

* * * * *